(12) United States Patent
Xu et al.

(10) Patent No.: US 7,565,356 B1
(45) Date of Patent: Jul. 21, 2009

(54) LIBERTY DISCOVERY SERVICE ENHANCEMENTS

(75) Inventors: Emily Hong Xu, Palo Alto, CA (US);
Qingwen Cheng, Fremont, CA (US);
Rajeev Angal, San Jose, CA (US);
Xuerbin Lue, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 421 days.

(21) Appl. No.: 10/837,146

(22) Filed: Apr. 30, 2004

(51) Int. Cl.
*G06F 17/30* (2006.01)

(52) U.S. Cl. .......... 707/10; 707/3; 707/6; 707/9; 707/102

(58) Field of Classification Search .......... 707/10; 705/14; 713/186
See application file for complete search history.

(56) References Cited

U.S. PATENT DOCUMENTS

| | | | |
|---|---|---|---|
| 5,629,980 A * | 5/1997 | Stefik et al. | 705/54 |
| 5,684,950 A * | 11/1997 | Dare et al. | 726/10 |
| 5,884,312 A * | 3/1999 | Dustan et al. | 707/10 |
| 5,898,780 A | 4/1999 | Liu et al. | |
| 5,944,824 A | 8/1999 | He | |
| 6,078,916 A * | 6/2000 | Culliss | 707/5 |
| 6,161,139 A | 12/2000 | Win et al. | |
| 6,263,342 B1 | 7/2001 | Chang et al. | |
| 6,405,214 B1 * | 6/2002 | Meade, II | 707/104.1 |
| 6,424,949 B1 * | 7/2002 | Deaton et al. | 705/14 |
| 6,438,690 B1 * | 8/2002 | Patel et al. | 713/156 |
| 6,587,124 B1 | 7/2003 | Slaby | |
| 6,609,198 B1 * | 8/2003 | Wood et al. | 713/155 |
| 6,807,636 B2 | 10/2004 | Hartman et al. | |
| 6,892,307 B1 | 5/2005 | Wood et al. | |
| 7,016,877 B1 * | 3/2006 | Steele et al. | 705/50 |
| 7,028,009 B2 * | 4/2006 | Wang et al. | 705/51 |

(Continued)

FOREIGN PATENT DOCUMENTS

EP 0 940 960 3/1998

(Continued)

OTHER PUBLICATIONS

Zhang et al., A Soap-oriented component-based framework supporting device-independent nultimedia Web services, 11-13 Dec. 2002, IEEE, pp. 40-47.*

(Continued)

*Primary Examiner*—Jessica N Le
(74) *Attorney, Agent, or Firm*—Osha • Liang LLP

(57) ABSTRACT

A mechanism is disclosed for providing a user's web service provider's (WSP's) access information to a web service consumer (WSC). In one embodiment, a directory service provider (DSP) receives, from a WSC, a request for a particular user's WSP access information. The request contains identifying information that is associated with the particular user. A repository indicates, for each user, an associated user characteristic. Each user characteristic is associated with a separate template object that indicates one or more WSP instances' access information. In response to receiving the request, the DSP determines, from the repository, the user characteristic that is associated with the particular user. The DSP sends, in a response to the WSC's request, the one or more WSP instances' access information that is indicated in the template object that is associated with the particular user's associated user characteristic. The WSC may use the WSP access information to direct a query to a particular WSP.

9 Claims, 5 Drawing Sheets

U.S. PATENT DOCUMENTS

| | | | |
|---|---|---|---|
| 7,039,658 B2 * | 5/2006 | Starkey | 707/203 |
| 7,085,840 B2 * | 8/2006 | de Jong et al. | 709/229 |
| 7,350,075 B1 * | 3/2008 | Eastham | 707/10 |
| 7,401,083 B2 * | 7/2008 | Daemke et al. | 707/9 |
| 2001/0029501 A1 * | 10/2001 | Yokobori et al. | 707/10 |
| 2002/0029336 A1 * | 3/2002 | Sekiyama et al. | 713/169 |
| 2002/0059521 A1 * | 5/2002 | Tasler | 713/186 |
| 2002/0073088 A1 * | 6/2002 | Beckmann et al. | 707/10 |
| 2002/0078042 A1 * | 6/2002 | Mata | 707/5 |
| 2002/0143755 A1 | 10/2002 | Wynblatt et al. | |
| 2002/0143943 A1 * | 10/2002 | Lee et al. | 709/225 |
| 2003/0149781 A1 * | 8/2003 | Yared et al. | 709/229 |
| 2003/0172127 A1 | 9/2003 | Northrup et al. | |
| 2003/0188016 A1 * | 10/2003 | Agarwalla et al. | 709/241 |
| 2004/0001594 A1 | 1/2004 | Krishnaswamy et al. | |
| 2004/0003139 A1 | 1/2004 | Cottrille et al. | |
| 2004/0003251 A1 | 1/2004 | Narin et al. | |
| 2004/0003268 A1 | 1/2004 | Bourne et al. | |
| 2004/0003269 A1 | 1/2004 | Waxman et al. | |
| 2004/0003270 A1 | 1/2004 | Bourne et al. | |
| 2004/0015783 A1 | 1/2004 | Lennon et al. | |
| 2004/0059728 A1 | 3/2004 | Miller et al. | |
| 2004/0073661 A1 * | 4/2004 | Eibach et al. | 709/224 |
| 2004/0083243 A1 * | 4/2004 | Feng et al. | 707/203 |
| 2004/0117170 A1 | 6/2004 | Walsh et al. | |
| 2004/0117460 A1 | 6/2004 | Walsh et al. | |
| 2004/0186826 A1 | 9/2004 | Choi et al. | |
| 2004/0230571 A1 | 11/2004 | Robertson | |
| 2004/0243832 A1 * | 12/2004 | Wilf et al. | 713/200 |
| 2004/0260949 A1 * | 12/2004 | Aoki et al. | 713/201 |
| 2006/0174348 A1 * | 8/2006 | Rhoads et al. | 726/26 |

FOREIGN PATENT DOCUMENTS

| | | |
|---|---|---|
| EP | 0 940 960 A1 | 3/1998 |
| EP | 1091274 A2 | 4/2002 |
| WO | WO 00/60484 A1 | 5/2000 |
| WO | WO 02/58336 A1 | 7/2002 |

OTHER PUBLICATIONS

United Kingdom Patent Office, "Examination Report under Section 18(3)" in regards to Application No. GB0507718.5, report dated May 16, 2006, 2 pages.

Current Claims, Applications No. GB0507718.5, 9 pages.

Liberty Alliance Project, "Liberty ID-FF Architecture Overview," Version 1.2, 2003, pp. 1-44.

United Kingdom Patent Office, "Combined Search and Examination Report," in regards to Application No. GB0507718.5, report dated Jun. 23, 2005, 5 pages.

Current Claims, Application No. GB0507718.5, 8 pages.

Lurie, Marty, The Federation—Database Interoperability, the Adventure Continues (Part 2), IBM, Jul. 17, 2003, located in the internet at http://www-128.ibm/developerworks/db2/library/techarticle/0307lurie/0307lurie.html, 19 pages.

U.S. Appl. No. 10/836,991, filed Apr. 30, 2004, Final Office Action, Mailing date Nov. 28, 2008.

U.S. Appl. No. 10/833,414, filed Apr. 27, 2004, Notice of Allowance, Mailing date Dec. 30, 2008.

* cited by examiner

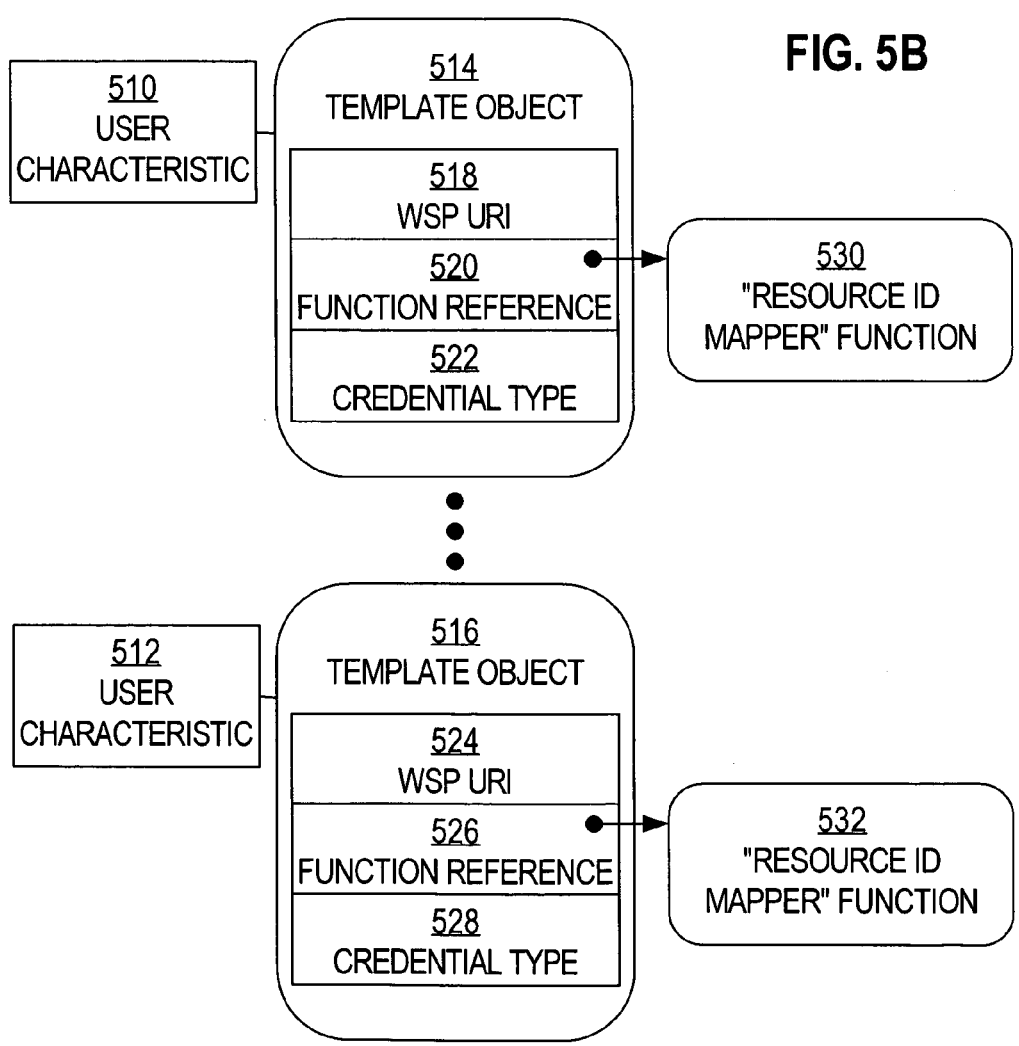

LIBERTY DISCOVERY SERVICE ENHANCEMENTS

BACKGROUND

The Liberty Alliance Project defines the Identity Web Services Framework (ID-WSF) upon the foundation of Identity Federation Framework (ID-FF) to provide a framework for identity-based web services in a federated network identity environment. A Liberty Identity Service Instance Specification (ID-SIS) is also defined to allow user's attribute information to be shared among "federated" service providers (SP).

Using the single sign-on functionality provided by an implementation of Liberty ID-FF, when a user's browser accesses a SP, the SP redirects the user's browser to a to a particular one of the providers that is designated as the user's "identity provider" ("IDP"). The IDP can authenticate the user and redirect the user's browser back to the SP that the user's browser originally accessed. As a result, the other SPs do not need to authenticate the user prior to allowing the user to access those other SPs' services. The user is spared the burden of separately providing authentication information (e.g., username and password) to each separate SP, even if the user's authentication information differs for each SP.

An implementation of Liberty ID-WSF and ID-SIS can also allow one SP to obtain a user's attribute information from another service provider. In such a scenario, the SP that seeks to obtain the attribute information is called the "web service consumer" ("WSC") and the service provider that provides the attribute information to the WSC is called the "web service provider" ("WSP"). For example, if the WSC needs a credit card number, a social security number, or any other attribute information for a user, the WSC can query the user's WSP and obtain the desired attribute information without asking the user to manually enter the information, which the user has already provided to the user's WSP.

Before a WSC can obtain a user's attribute information from the user's WSP, the WSC needs to have access information that tells the WSC how to access the user's WSP. This access information may comprise, for example, a Simple Object Access Protocol (SOAP) endpoint of the WSP. Using the WSP's endpoint, the WSC can direct queries to the WSP.

In order to obtain such access information for the WSP, the WSC may query a directory service provider ("DSP"). In many cases, the DSP is hosted on the same computer as the IDP. The DSP typically has access to a data structure that contains associations between users and the access information (Resource Offering) for those users' WSPs (each separate user may be associated with one or more different WSPs). Thus, the WSC may query the DSP, indicating, in the query, identifying information that is associated with a particular user. Receiving the query, the DSP may determine, from the data structure, the access information for WSP instances that are associated with the particular user. The DSP may respond to the WSC's query with the particular WSP's access information. Receiving the response, the WSC may then query the particular WSP to request the particular user's attribute information as described above.

The data structure discussed above needs to contain an association between a user and that user's WSPs' access information before the DSP can provide that access information to a WSC. Often, thousands of users that belong to a single business organization should be associated with the same WSP access information. For example, a company might outsource, to the same benefits provider, all of the benefits for all of the company's employees. In such a scenario, associations would need to be established between each employee and the benefits provider, which functions as a WSP.

One approach to establishing these associations uses Liberty Discovery Service's "Modify" operation. Using the modify operation, an association between a user and a WSP's access information can be inserted into the data structure discussed above. However, the Modify operation is designed to insert only one user association into the data structure at a time. Thus, in the case of millions of users, the Modify operation would need to be invoked millions of times.

Additionally, the discussion above assumes that the WSC is enabled to use an implementation of Liberty ID-FF version 1.2. According to Liberty ID-FF version 1.2, an IDP provides "bootstrap" information to a WSC when the IDP redirects the user's browser to the WSC, as described above. The bootstrap information indicates how to access the user's DSP.

However, some WSCs are not enabled to use Liberty ID-FF version 1.2. Some WSCs are enabled to use Liberty ID-FF version 1.1. Some WSCs are not enabled to use Liberty ID-FF at all. WSCs that are not enabled to use Liberty ID-FF version 1.2 do not receive the bootstrap information from a user's IDP as described above. Without the bootstrap information, such non-enabled WSCs are unable to query a user's WSP in order to discover the user's WSP's access information.

SUMMARY

In accordance with one embodiment of the present invention, a mechanism is disclosed for providing a user's WSP's access information to a WSC. In one embodiment, a DSP receives, from a WSC, a request for a particular user's WSP's access information. The request contains identifying information that is associated with the particular user.

A repository accessible to the DSP indicates, for each user, an associated user characteristic. Multiple users may be associated with the same user characteristic. In one embodiment, each user characteristic is associated with a separate template object that contains access information for one or more WSPs.

In response to receiving the request, the DSP determines, from the repository, the user characteristic that is associated with the particular user. In one embodiment, the DSP sends, in a response to the WSC's request, one or more WSP's access information that is indicated in the template object that is associated with the particular user's associated user characteristic. The WSC may use the WSP access information to direct a query to a particular WSP.

BRIEF DESCRIPTION OF THE DRAWINGS

FIG. 5A is a block diagram that shows associations between users and user characteristics in accordance with one embodiment of the present invention.

FIG. 5B is a block diagram that shows associations between user characteristics and template objects, in accordance with one embodiment of the present invention.

DETAILED DESCRIPTION OF EMBODIMENT(S)

Overview

Figure 1:
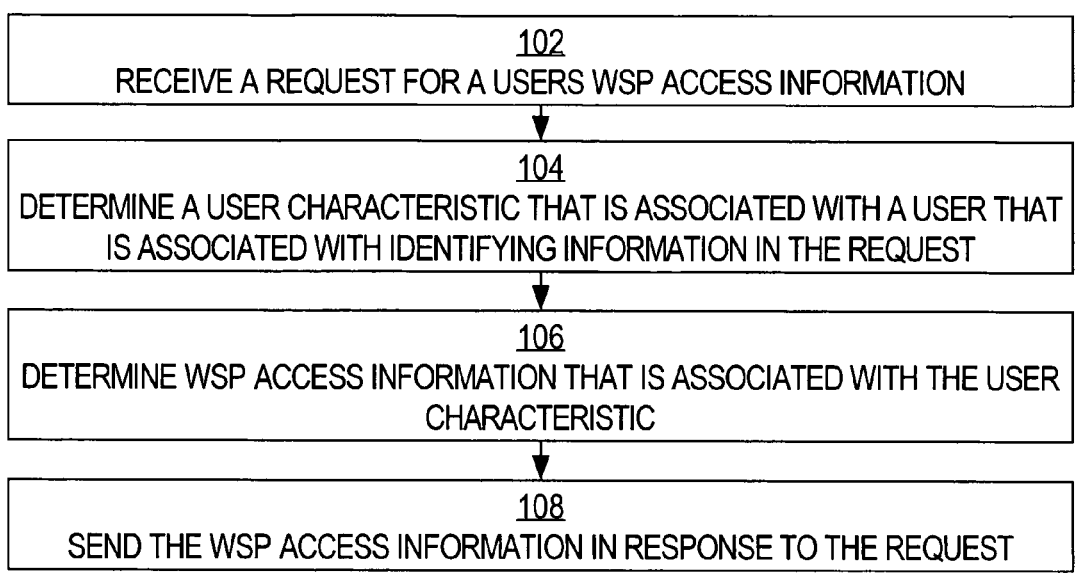
FIG. 1 depicts an overview of an operational flow for Discovery Service to provide a user's WSP access information to a WSC, in accordance with one embodiment of the present invention.

FIG. 1 depicts an overview of an operational flow for Discovery Service to provide a user's WSP's access information to a WSC, in accordance with one embodiment of the present invention. In block 102, a request for WSP access information is received. The request indicates identifying information that is associated with a user. In block 104, a user characteristic that is associated with the user is determined. In block 106, WSP access information that is associated with the user characteristic is determined. In block 108, the WSP access information is sent in a response to the request.

Sample Implementation

Figure 2:
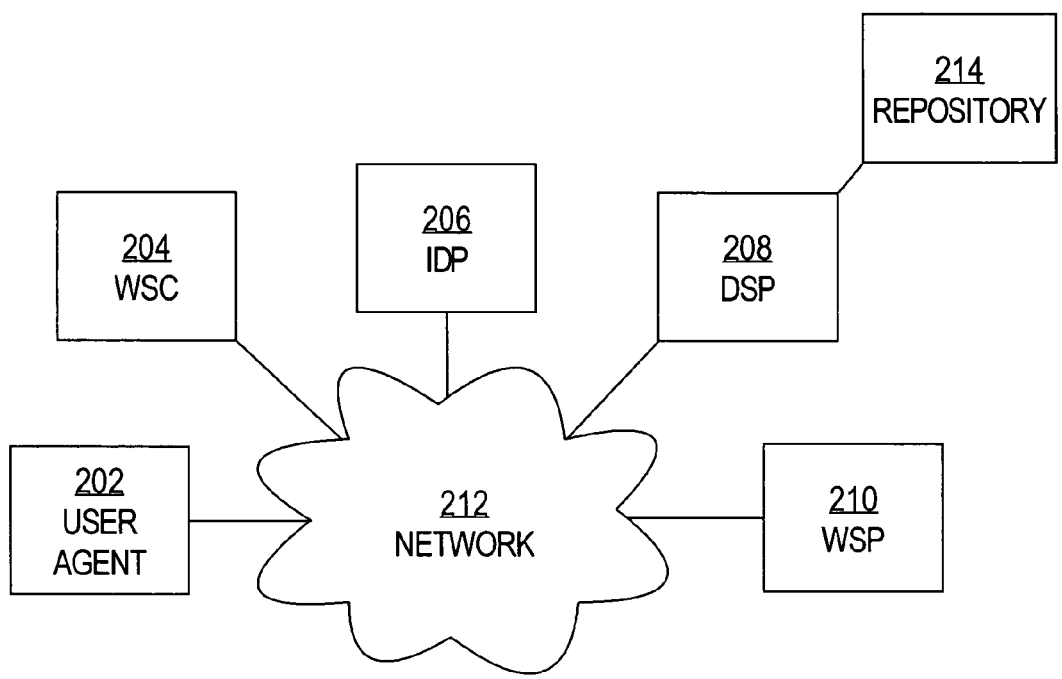
FIG. 2 is a functional block diagram of a system in which one embodiment of the present invention may be implemented.

FIG. 2 is a functional block diagram of a system in which one embodiment of the present invention may be implemented. In the system, a user agent 202, a WSC 204 (which is also an SP), an IDP 206, a DSP 208, and a WSP 210 are communicatively coupled via a network 212. Network 212 may be a local area network (LAN), a wide area network (WAN), or an inter-network such as the Internet, for example. As discussed above, each of WSC 204, IDP 206, DSP 208, and WSP 210 may be separate processes executing on separate computers. User agent 202 may be an Internet browser.

In one embodiment, a user directs user agent 202 to send a request to WSC 204. Such a request may be, for example, a Hypertext Transfer Protocol (HTTP) request. Before WSC 204 can securely offer services to the user, WSC 204 might need to authenticate the user. Instead of directly requesting authentication information from the user, WSC 204 may act as a service provider (SP), according to Liberty ID-FF, and direct user to IDP 206 to authenticate the user. The Liberty ID-FF authentication technique may proceed as follows.

WSC 204 sends, to user agent 202, a response that instructs user agent 202 to send a request to IDP 206. Such a response may be, for example, an HTTP "redirect" response. The response may contain embedded information that identifies WSC 204.

Upon receiving the response from WSC 204, user agent 202 may automatically send a request to IDP 206. The request may contain embedded information that was contained in the response from WSC 204. IDP 206 receives the request and sends, to user agent 202, a response that asks the user to provide authentication information.

After the user has provided correct authentication information to IDP 206 through user agent 202, IDP 206 may send, to user agent 202, a response that instructs user agent 202 to redirect to WSC 204. The response may contain embedded information. If WSC 204 is enabled to use Liberty ID-FF version 1.2, then the embedded information may include "bootstrap" information that indicates (a) access information for the user's associated DSP, (b) identifying information that identifies the user to the user's associated DSP, and (c) a credential that the user's associated DSP may require, as a security measure, before responding to queries.

Upon receiving the response from IDP 206, user agent 202 may automatically redirect to WSC 204. The WSC will examine the authentication assertion within the response to determine if the user is authentic. Thus, the Liberty ID-FF authentication technique is concluded. Thereafter, WSC 204 may allow the user to access services provided by WSC 204 through user agent 202.

During the course of interaction with the user through user agent 202, WSC 204 may need some attribute information for the user. For example, WSC 204 may need a credit card number, a social security number, or other attribute information for the user. Instead of requesting the attribute information directly from the user, WSC 204 may, according to Liberty ID-WSF, obtain the desired attribute information from a WSP that holds the user's personal profile information.

However, in order to query the WSP, WSC 204 needs to have access information for the WSP. Without such access information, WSC 204 does not know where to direct the attribute information query. To obtain the WSP access information, WSC 204 queries the user's DSP.

Assuming that WSC 204 is enabled to use Liberty ID-FF version 1.2, WSC 204 obtains "bootstrap" information from IDP 206 as described above. The bootstrap information indicates access information for the user's DSP. In one embodiment, the access information includes a universal resource identifier (URI) for the DSP. In one embodiment, the DSP's URI is a SOAP endpoint that is associated with the DSP.

For example, the DSP might be DSP 208. In this case, WSC 204 sends, via network 212, a query to the URI for DSP 208. The query contains identifying information that is associated with the user. In order to protect the user's identity, in one embodiment, the identifying information is different from any identifier that the user would use to authenticate himself to WSC 204 or DSP 208. DSP 208 maintains a mapping between the identifying information and the user's identity within DSP 208. Therefore, DSP 208 can determine the user's identity from the identifying information, but other parties who do not know the mapping cannot. WSC 204 may get the identifying information in the bootstrap information discussed above.

In one embodiment, the query that WSC 204 sends to DSP 208 also contains a credential that DSP 208 can inspect in order to verify the legitimacy of WSC 204. The credential may be, for example, an X.509 token. WSC 204 may get the credential in the bootstrap information discussed above. DSP 208 may determine whether the credential is valid. If the credential is not valid, then DSP 208 may refuse to respond to the query that contained the credential.

A repository 214 is accessible to DSP 208. Repository 214 may be a database, for example. Repository 214 contains information about multiple users. For each such user, repository 214 indicates an associated user characteristic. Multiple users may be of the same user characteristic. Different users may be of different user characteristics. For example, a first user may be of an "employee" user characteristic, while a second user may be of a "contractor" user characteristic. For another example, a first user may be of an "organization A" user characteristic, while a second user may be of an "organization B" user characteristic. An administrator of repository 214 may establish associations between users and user characteristics.

Such associations may be generated, for example, in the regular course of the operation of a company that maintains repository 214. For example, when a user joins a company, a record may be created for that user in repository 214, and at the time the record is created, a field in the record may be populated to indicate the user's associated user characteristic.

Thus, no extra work is required to generate such associations. The user characteristic may correspond to any one or more of a number of fields in such a record. An administrator of repository 214 may, through configuration, define the fields that correspond to the user characteristic.

According to one embodiment, instead of separately associating each user with a WSP by using the Liberty Discovery Service "Modify" operation once for each user, entire groups of users may be associated with a WSP all at once by associating a user characteristic with a template object. A template object may be instantiated from a template class, and a separate template object may be instantiated for each different user characteristic. Each template object may indicate access information for one or more WSPs. Access information for a WSP may include a URI for the WSP. The URI may be a SOAP endpoint of the WSP. DSP 208 may maintain such template objects and the associations between user characteristics and template objects.

For example, an administrator of DSP 208 may instantiate a particular template object that has, as an attribute, the URI of WSP 210. The administrator may establish an association between an "employee" user characteristic and the particular template object. If the administrator wishes to change the WSP that is associated with the "employee" user characteristic, the administrator can modify the URI indicated by the particular template object, or establish an association between the "employee" user characteristic and a different template object that indicates a URI for a different WSP. Thus, the "Modify" operation does not need to be used separately for each user when the administrator wishes to change users' WSP.

In one embodiment, DSP 208 receives a query from WSC 204. The query contains identifying information that is associated with the user, as described above. Based on the identifying information, DSP 208 determines the user's identity. In one embodiment, DSP 208 determines, from repository 214, a particular user characteristic that is associated with the user's identity. Based on the associations established between user characteristics and template objects, DSP 208 determines a particular template object that is associated with the particular user characteristic.

In one embodiment, DSP 208 returns, to WSC 204, a response to the query that WSC 204 sent to DSP 208. The response contains the WSP access information that was contained in the particular template object. For example, the WSP access information may indicate a URI for WSP 210.

In one embodiment, the response also contains a credential that WSP 210 can use to verify the access rights of WSC 204. Each template object may indicate, as an attribute, a credential type. For example, the credential type may be "X.509". Based on the credential type indicated in the particular template object, DSP 208 may generate a credential of the indicated type and send the credential in the response to WSC 204.

In one embodiment, the response also contains identifying information that WSP 210 can use to determine the user's identity. Each template object may indicate, as an attribute, a reference to a particular "resource ID mapper" function. Different template objects may refer to different "resource ID mapper" functions. Using the reference, DSP 208 may pass the user's identity (as known to DSP 208) as input into the referenced particular "resource ID mapper" function. In response, the particular "resource ID mapper" function generates identifying information that corresponds to the user's identity. The "resource ID mapper" function is designed so that, given a particular user identity (as known to DSP 208), the function always generates the same identifying information.

In order to protect the user's identity, in one embodiment, the identifying information is different from any identifier that the user would use to authenticate himself to WSC 204 or WSP 210. WSP 210 maintains a mapping between the identifying information and the user's identity within WSP 210. Therefore, WSP 210 can determine the user's identity from the identifying information, but other parties who do not know the mapping cannot.

In one embodiment, WSC 204 receives, via network 212, the response sent from DSP 208. From the response, WSC 204 can determine the URI for WSP 210. WSC 204 sends, to the URI for WSP 210, a query for the user's desired attribute information. In one embodiment, the query includes the identifying information and the credential that WSC 204 received from DSP 208.

In one embodiment, WSP 210 receives the query from WSC 204. WSP 210 may determine whether the credential contained in the query is valid. If the credential is not valid, then WSP 210 may refuse to respond to the query that contained the credential.

Based on the identifying information contained in the query, WSP 210 determines the user's identity. WSP 210 determines attribute information that is associated with the user's identity. WSP 210 sends, to WSC 204 via network 212, a response to the query from WSC 204. The response contains the user's desired attribute information.

WSC 204 receives the response from WSP 210. WSC 204 can use the attribute information contained in the response in further transactions with the user. For example, if the attribute information contains a credit card number, then WSC 204 can use the credit number to bill the user for a purchase that the user initiated through WSC 204. As a result, the user does not need to provide the credit card number to WSC 204.

FIG. 5A is a block diagram that shows associations between users and user characteristics in accordance with one embodiment of the present invention. Repository 214 contains records for users 502, 504, 506, and 508. Users 502 and 504 are associated with user characteristic 510. Users 506 and 508 are associated with user characteristic 512.

FIG. 5B is a block diagram that shows associations between user characteristics and template objects, in accordance with one embodiment of the present invention. User characteristic 510 is associated with template object 514. User characteristic 512 is associated with template object 516. Template object 514 indicates, as attributes, WSP URI 518, function reference 520, and credential type 522. Template object 516 indicates, as attributes, WSP URI 524, function reference 526, and credential type 528. Function reference 520 refers to "resource ID mapper" function 530. Function reference 526 refers to "resource ID mapper" function 532.

WSCs that are not Liberty ID-FF Version 1.2 Enabled

The implementation discussed above assumes that WSC 204 is Liberty ID-FF version 1.2 enabled. However, some WSCs are not Liberty ID-FF version 1.2 enabled. Such WSCs are not enabled to receive, from an IDP, the bootstrap information described above. The bootstrap information contains the access information for the user's DSP. Without such access information, a WSC cannot direct a query to the user's DSP, and, consequently, cannot obtain, from the DSP, the access information for the user's WSP.

According to one embodiment, an alternative technique is provided whereby a WSC can obtain DSP access information. The alternative technique is described below.

In one embodiment, instead of WSC 204 obtaining access information for DSP 208 from bootstrap information, WSC 204 is pre-configured with static access information for DSP 208. WSC 204 also may be pre-configured with a static credential that DSP 208 uses to validate WSC 204—the credential that otherwise would be sent to WSC 204 in the bootstrap information as described above.

In one embodiment, in order to obtain the identifying information that DSP 208 uses to identify the user—the identifying information that otherwise would be sent to WSC 204 in the bootstrap information described above, WSC 204 instead generates a remote procedure call (RPC) to an RPC interface provided by IDP 206. The interface allows remote access to a "resource ID mapper" function that is associated with DSP 208. In the RPC, WSC 204 passes first identifying information that is associated with the user.

Through the RPC interface, the "resource ID mapper" function receives the first identifying information. The first identifying information is passed as input into the "resource ID mapper" function. In response, the "resource ID mapper" function generates second identifying information that corresponds to the user's identity. The "resource ID mapper" function is designed so that, given particular first identifying information, the function always generates the same second identifying information. However, the "resource ID mapper" function generates different output when passed different input.

In one embodiment, WSC 204 receives the second identifying information as a result of the RPC. WSC 204 can send the second identifying information to DSP 208 as though the second identifying information was the identifying information that otherwise would be received in the bootstrap information described above. Based on the second identifying information, DSP 208 can determine the user's identity.

Sample Operation

Figure 3:
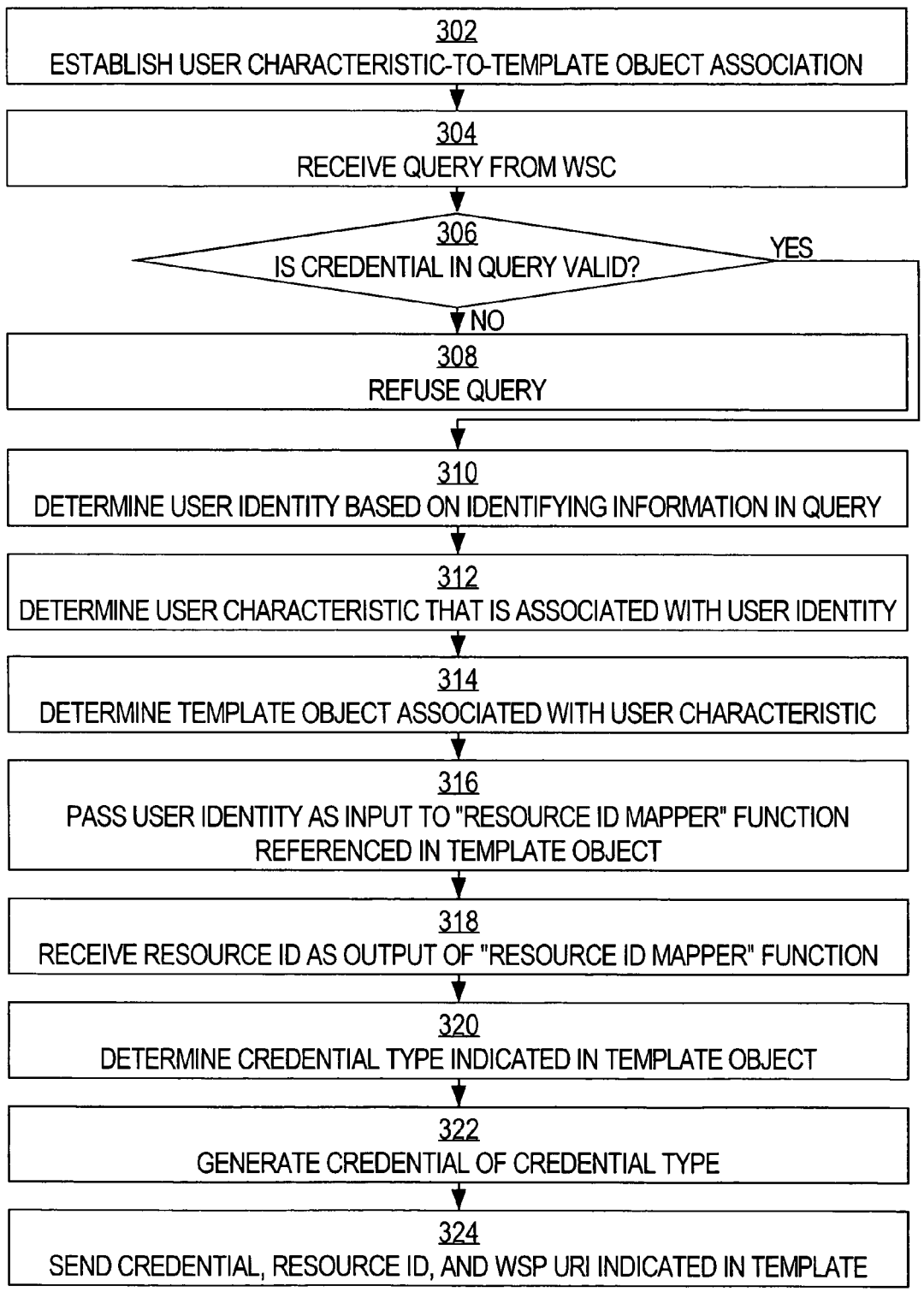
FIG. 3 depicts a more detailed operational flow for Discovery Service to provide a user's WSP access information to a WSC, in accordance with one embodiment of the present invention.

FIG. 3 depicts a more detailed operational flow for providing a user's WSP's access information to a WSC, in accordance with one embodiment of the present invention. For example, DSP 208 may perform the operations depicted.

In block 302, an association is established between a user characteristic and a template object. Different user characteristics may be associated with different template objects. Each template object may be a separate instance of a template class. Each template object may indicate a URI for an WSP, a credential type, and a reference to a "resource ID mapper" function. Different template objects may indicate different URIs, different credential types, and references to different "resource ID mapper" functions.

In block 304, a query is received from a WSC. The query indicates identifying information and a credential. In block 306, it is determined whether the credential is valid. If the credential is valid, then control passes to block 310. If the credential is not valid, then control passes to block 308.

In block 308, the query is refused, and the operational flow ends relative to the query. Alternatively, in block 310, a user identity is determined based on the identifying information. Control passes to block 312.

In block 312, a user characteristic that is associated with the user identity is determined based on an association in a repository. In block 314, a particular template object that is associated with the user characteristic is determined based on an association between the template object and the user characteristic (e.g., the association established in block 302).

In block 316, the user identity is passed as input to a "resource ID mapper" function that is referenced in the particular template object. In block 318, a "resource ID" is received as output of the "resource ID mapper" function. The "resource ID" contains identifying information that the WSP can use to identify the user.

In block 320, a credential type that is indicated in the particular template object is determined. In block 322, a credential of the credential type is generated. In block 324, a response is sent to the WSC that sent the query. The response contains the credential (generated in block 322), the "resource ID," and a WSP URI that is indicated in the particular template object.

Hardware Overview

Figure 4:
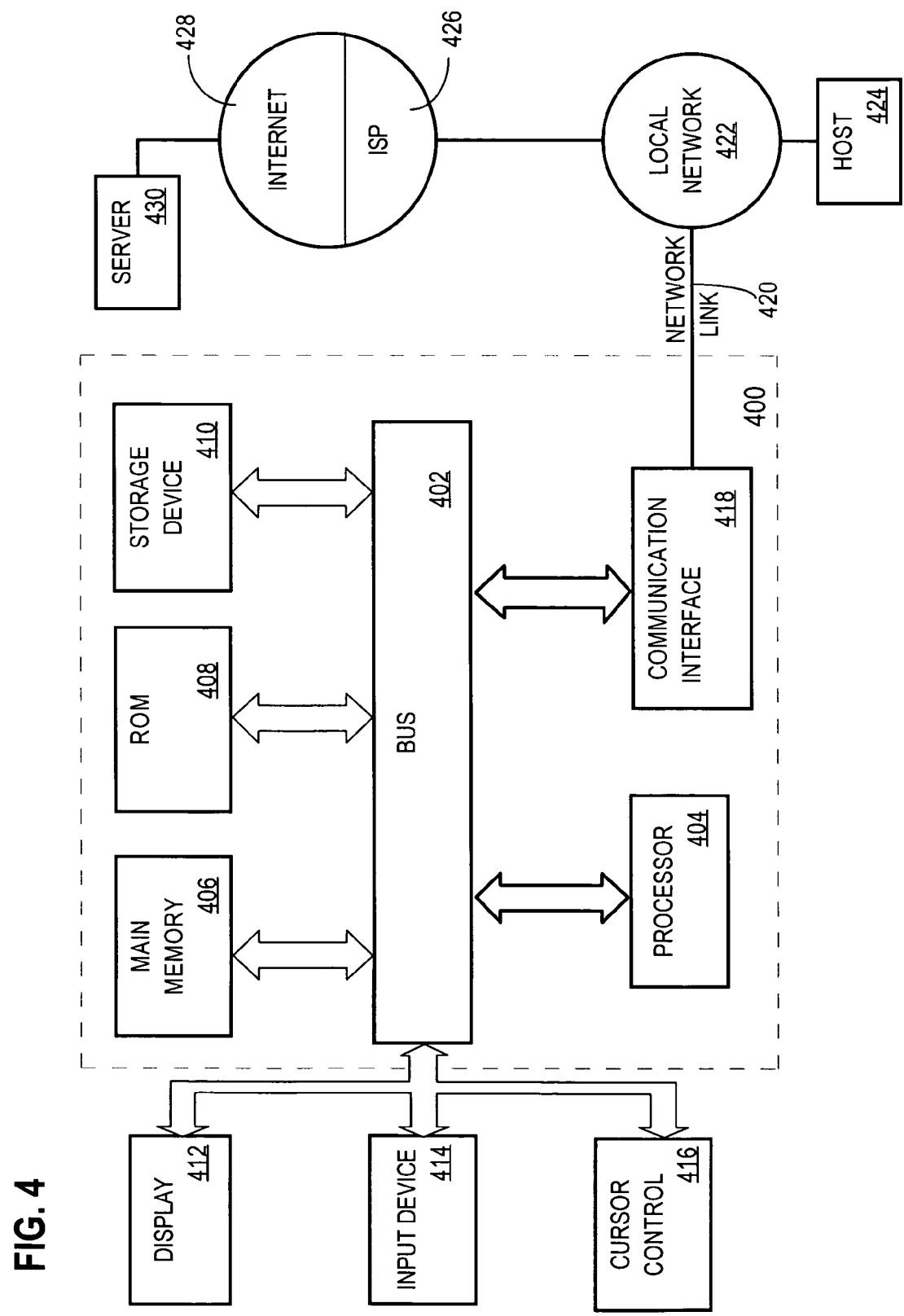
FIG. 4 is a hardware block diagram of a sample computer system, upon which one or more components of an embodiment of the present invention may be implemented.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions. Although the components of computer system 400 are depicted as being within a single chasse, it is contemplated that the components of computer system 400 may be distributed among multiple separate devices that are communicatively coupled via a network.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
    storing, in a repository, a first association between a particular user characteristic and a first user;
    storing, in the repository, a second association between the particular user characteristic, which is associated with the first user, and a second user that is separate from the first user;
    after storing the associations between the particular user characteristic and the first and second users, storing, in the repository, a third association between (a) first web service provider (WSP) access information, which indicates how to access a first WSP, and (b) the particular user characteristic;

a directory service provider (DSP) receiving, from a second WSP that is separate from the first WSP, a first request for access information for WSP instances, wherein the first request indicates first identifying information that is associated with the first user;

in response to the DSP receiving the first request, the DSP searching the repository for user characteristics that are associated with the first user;

the DSP determining, from the repository-stored first association between the particular user characteristic and the first user, that the first user is associated with the particular user characteristic;

in response to determining that the first user is associated with the particular user characteristic, the DSP searching the repository for WSP access information that is associated with the particular user characteristic;

the DSP determining, from the repository-stored third association between the particular user characteristic and the first WSP access information, that the particular user characteristic is associated with the first WSP access information;

in response to a determination that the particular user characteristic is associated with the first WSP access information, the DSP sending the first WSP access information to the second WSP in a response to the first request from the second WSP;

wherein the second WSP uses the first WSP access information to send, to a Universal Resource Identifier (URI) that is specified in the first WSP access information, a request for information that the first WSP maintains regarding the first user;

instantiating an instance of a template class, wherein an attribute of the instance of the template class indicates the first WSP access information;

establishing an association between the particular user characteristic and the instance of the template class;

determining that the particular user characteristic is associated with a particular credential type;

in response to a determination that the particular user characteristic is associated with the particular credential type, generating a credential of the particular credential type;

sending the credential in the response to the first request;

determining that the particular user characteristic is associated with a particular function;

in response to a determination that the particular user characteristic is associated with the particular function, using the particular function to generate second identifying information; and sending the second identifying information in the response to the first request.

2. The method of claim 1, further comprising:

the DSP receiving a second request for access information for WSP instances, wherein the second request indicates second identifying information that is associated with the second user;

the DSP determining that the second user is associated with the particular user characteristic; and in response to a determination that the particular user characteristic is associated with the first WSP access information, the DSP sending the first WSP access information in a response to the second request.

3. A machine-readable storage medium, comprising:

instructions for causing one or more processors to cause storing, in a repository, an association between a particular user characteristic and a first user;

instructions for causing one or more processors to cause storing, in the repository, an association between the particular user characteristic, which is associated with the first user, and a second user that is separate from the first user;

instructions for causing one or more processors to cause storing, in the repository, after storing the associations between the particular user characteristic and the first and second users, an association between (a) first web service provider (WSP) access information, which indicates how to access a first WSP, and (b) the particular user characteristic;

instructions for causing one or more processors to cause a directory service provider (DSP) to receive, from a second WSP that is separate from the first WSP, a first request for access information for WSP instances, wherein the first request indicates first identifying information that is associated with the first user;

instructions for causing one or more processors to cause the DSP to search the repository, in response to receiving the first request, for user characteristics that are associated with the first user;

instructions for causing one or more processors to cause a DSP to determine, from the repository-stored association between the particular user characteristic and the first user, that the first user is associated with the particular user characteristic;

instructions for causing one or more processors to cause the DSP to search the repository, in response to determining that the first user is associated with the particular user characteristic, for WSP access information that is associated with the particular user characteristic;

instructions for causing one or more processors to cause the DSP to determine, from the repository-stored association between the particular user characteristic and the first WSP access information, that the particular user characteristic is associated with the first WSP access information;

instructions for causing one or more processors to cause the DSP to send, in response to a determination that the particular user characteristic is associated with the first WSP access information, the first WSP access information to the second WSP in a response to the first request from the second WSP;

wherein the second WSP uses the first WSP access information to send, to a Universal Resource Identifier (URI) that is specified in the first WSP access information, a request for information that the first WSP maintains regarding the first user;

instructions for causing one or more processors to instantiate an instance of a template class, wherein an attribute of the instance of the template class indicates the first WSP access information;

instructions for causing one or more processors to establish an association between the particular user characteristic and the instance of the template class;

instructions for causing one or more processors to determine that the particular user characteristic is associated with a particular credential type;

instructions for causing one or more processors to generate, in response to a determination that the particular user characteristic is associated with the Particular credential type, a credential of the particular credential type;

instructions for causing one or more processors to send the credential in the response to the first request;

instructions for causing one or more processors to determine that the particular user characteristic is associated with a particular function;

instructions for causing one or more processors to use, in response to a determination that the particular user characteristic is associated with the particular function, the particular function to generate second identifying information; and instructions for causing one or more processors to send the second identifying information in the response to the first request.

4. The machine-readable storage medium of claim 3, further comprising:

instructions for causing one or more processors to cause the DSP to receive a second request for access information for an WSP, wherein the second request indicates second identifying information that is associated with the second user;

instructions for causing one or more processors to cause the DSP to determine that the second user is associated with the particular user characteristic;

instructions for causing one or more processors to cause the DSP to send, in response to a determination that the particular user characteristic is associated with the first WSP access information, the first WSP access information in a response to the second request.

5. An apparatus, comprising:

one or more processors;

a mechanism, executing using the one or more processors, for storing, in a repository, an association between a particular user characteristic and a first user;

a mechanism, executing using the one or more processors, for storing, in the repository, an association between the particular user characteristic, which is associated with the first user, and a second user that is separate from the first user;

a mechanism, executing using the one or more processors, for storing, in the repository, after storing the associations between the particular user characteristic and the first and second users, an association between (a) first web service provider (WSP) access information, which indicates how to access a first WSP, and (b) the particular user characteristic that is associated with two or more users;

a mechanism, executing using the one or more processors, for receiving, at a directory service provider (DSP), from a second WSP that is separate from the first WSP, a first request for access information for WSP instances, wherein the first request indicates first identifying information that is associated with the first user;

a mechanism, executing using the one or more processors, for causing the DSP to search the repository, in response to the DSP receiving the first request, for user characteristics that are associated with the first user;

a mechanism, executing using the one or more processors, for determining, at the DSP, from the repository-stored association between the particular user characteristic and the first user, that the first user is associated with the particular user characteristic;

a mechanism, executing using the one or more processors, for causing the DSP to search the repository, in response to determining that the first user is associated with the particular user characteristic, for WSP access information that is associated with the particular user characteristic;

a mechanism, executing using the one or more processors, for determining, at the DSP, from the repository-stored association between the particular user characteristic and the first WSP access information, that the particular user characteristic is associated with the first WSP access information;

a mechanism, executing using the one or more processors, for sending, from the DSP, in response to a determination that the particular user characteristic is associated with the first WSP access information, the first WSP access information to the second WSP in a response to the first request from the second WSP;

wherein the second WSP uses the first WSP access information to send, to a Universal Resource Identifier (URI) that is specified in the first WSP access information, a request for information that the first WSP maintains regarding the first user;

a mechanism, executing using the one or more processors, for instantiating an instance of a template class, wherein an attribute of the instance of the template class indicates the first WSP access information;

a mechanism, executing using the one or more processors, for establishing an association between the particular user characteristic and the instance of the template class;

a mechanism, executing using the one or more processors, for determining that the particular user characteristic is associated with a particular credential type;

a mechanism, executing using the one or more processors, for generating, in response to a determination that the particular user characteristic is associated with the particular credential type, a credential of the particular credential type;

a mechanism, executing using the one or more processors, for sending the credential in the response to the first request;

a mechanism, executing using the one or more processors, for determining that the particular user characteristic is associated with a particular function;

a mechanism, executing using the one or more processors, for using, in response to a determination that the particular user characteristic is associated with the particular function, the particular function to generate second identifying information; and a mechanism, executing using the one or more processors, for sending the second identifying information in the response to the first request.

6. The apparatus of claim 5, further comprising:

a mechanism, executing using the one or more processors, for receiving, at the DSP, a second request for access information for WSP instances, wherein the second request indicates second identifying information that is associated with the second user;

a mechanism, executing using the one or more processors, for determining, at the DSP, that the second user is associated with the particular user characteristic;

a mechanism, executing using the one or more processors, for sending, from the DSP, in response to a determination that the particular user characteristic is associated with the first WSP access information, the first WSP access information in a response to the second request.

7. The method of claim 1, wherein:

the first WSP access information does not contain any username of the first user; and the first WSP access information does not contain any password of the first user.

8. The machine-readable storage medium of claim 3, wherein:

the first WSP access information does not contain any username of the first user; and the first WSP access information does not contain any password of the first user.

9. The apparatus of claim 5, wherein:

the first WSP access information does not contain any username of the first user; and the first WSP access information does not contain any password of the first user.

* * * * *